United States Patent [19]

Ueno et al.

[11] Patent Number: 4,618,930
[45] Date of Patent: Oct. 21, 1986

[54] AUTOMATIC TRAIN CONTROL APPARATUS

[75] Inventors: Masahiro Ueno; Korefumi Tashiro, both of Hitachi; Eiichi Toyota, Katsuta, all of Japan

[73] Assignee: Hitachi Ltd., Tokyo, Japan

[21] Appl. No.: 661,388

[22] Filed: Oct. 16, 1984

Related U.S. Application Data

[63] Continuation of Ser. No. 307,202, Sep. 30, 1981, abandoned.

[30] Foreign Application Priority Data

Oct. 3, 1980 [JP] Japan .................. 55-137652

[51] Int. Cl.[4] .................. B61L 3/08
[52] U.S. Cl. .................. 364/426; 246/182 C
[58] Field of Search .................. 364/424, 426; 246/182 R, 182 A, 182 B, 122 C, 187 R; 371/37

[56] References Cited

U.S. PATENT DOCUMENTS

| | | | |
|---|---|---|---|
| 3,749,994 | 7/1973 | Matty | 246/182 B |
| 3,752,084 | 8/1973 | Riondel | 246/182 C |
| 3,921,946 | 11/1975 | Norton et al. | 246/182 B |
| 3,992,698 | 11/1976 | Sahasrabudhe et al. | 246/187 R |
| 4,002,314 | 1/1977 | Barpal | 246/182 R |
| 4,015,082 | 3/1977 | Matty et al. | 364/426 |
| 4,093,162 | 6/1978 | Takaoka et al. | 364/426 |
| 4,117,458 | 9/1978 | Burghard et al. | 371/37 |
| 4,217,643 | 8/1980 | Anderson et al. | 246/187 R |
| 4,312,577 | 1/1982 | Fitzgerald | 364/424 |
| 4,459,668 | 7/1984 | Inoue et al. | 364/426 |

*Primary Examiner*—Gary Chin
*Attorney, Agent, or Firm*—Antonelli, Terry & Wands

[57] ABSTRACT

In an ATC apparatus, an ROM stores a plurality of parameters used for identification of an ATC signal. These parameters are sequentially read out from the ROM and applied to a ring-arithmetic type frequency pattern generating circuit to be converted into a plurality of pulse trains having respective reference frequencies. These pulse trains are then sequentially applied to a ring-arithmetic type frequency comparison circuit and are compared with the frequency-modulated ATC signal in a time division mode so as to identify the speed limit indicated by the ATC signal. The frequency pattern generating circuit generates also a pulse train corresponding to the speed limit. The frequency comparison circuit executes also comparison between the frequency of the pulse train indicative of the speed limit and that of a pulse train indicative of the detected train speed, and an ATC brake instruction signal is generated when the result of comparison proves that the detected train speed exceeds the speed limit. The frequency pattern generating circuit and the frequency comparison circuit are included in a single LSI.

14 Claims, 15 Drawing Figures

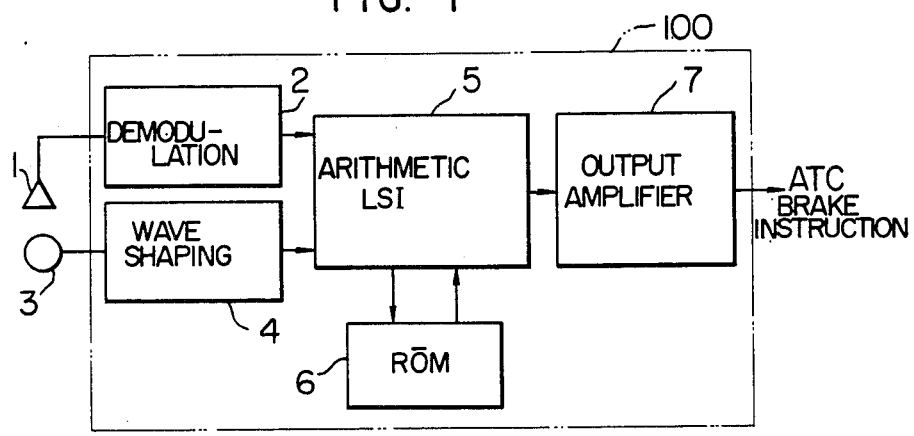

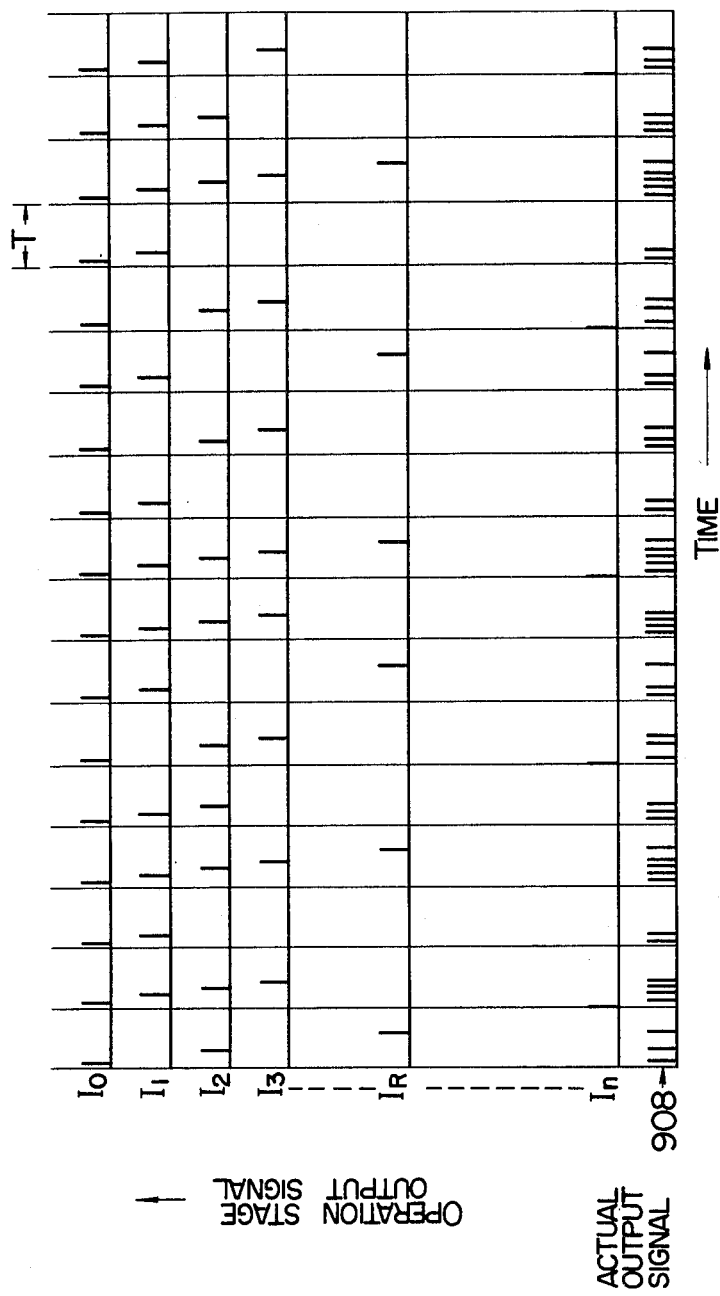

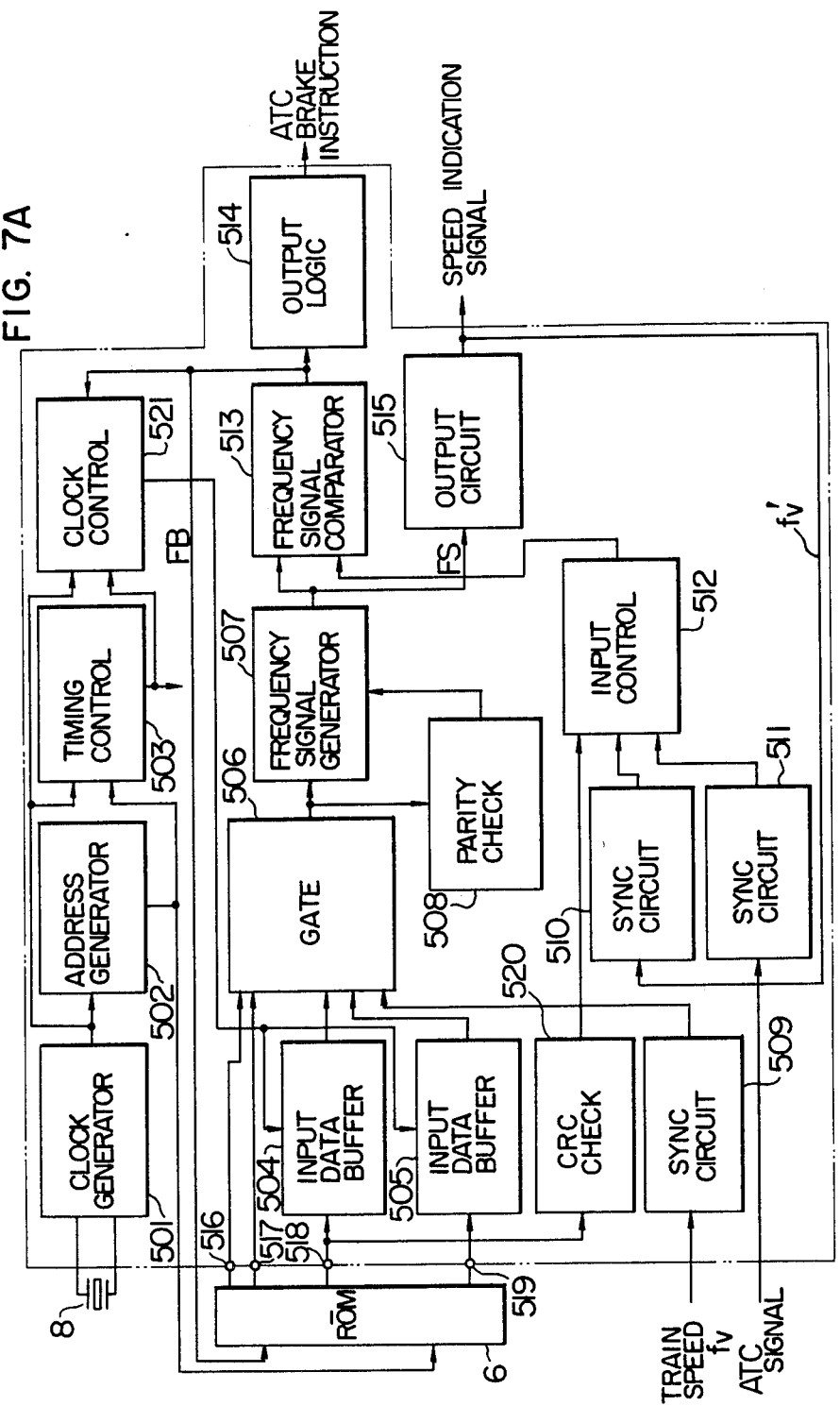

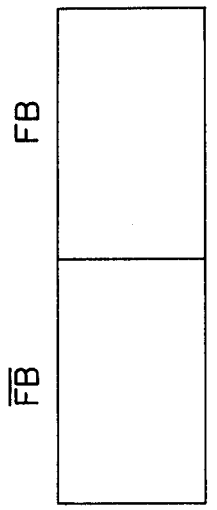

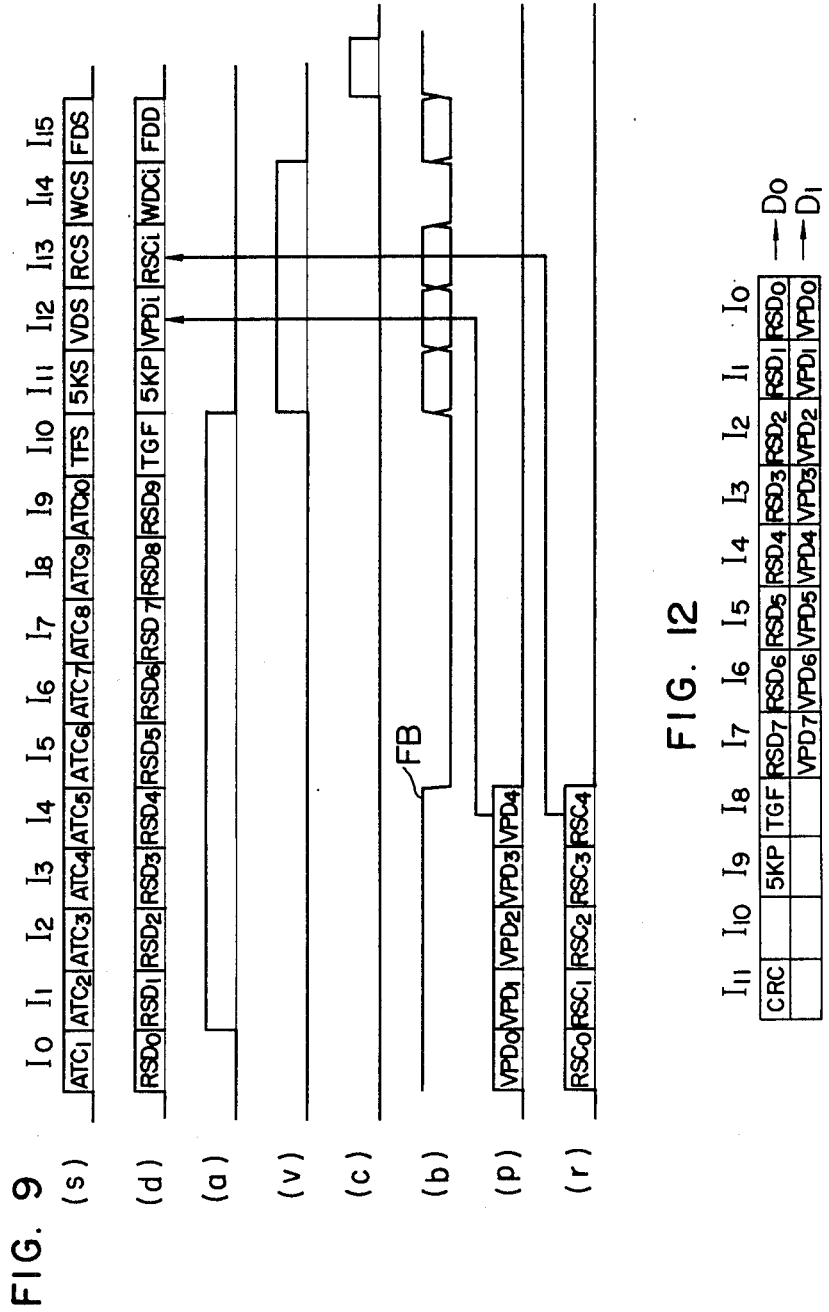

AUTOMATIC TRAIN CONTROL APPARATUS

This is a continuation of Application Ser. No. 307,202 filed Sept. 30, 1981 is now abandoned.

BACKGROUND OF THE INVENTION

1. Field of the Invention

This invention relates to improvements in an automatic train control apparatus (which will be abbreviated hereinafter as an ATC apparatus).

An ATC apparatus functions to control the running speed of a railway train to within a predetermined speed limit which is variable depending on the condition of the scheduled run of the train and also on the condition of the tracks. From its nature, the ATC apparatus is required to be highly fail-safe.

2. Description of the Prior Art

A prior art ATC apparatus is generally composed of a signal receiving section which receives a frequency-modulated ATC signal transmitted from a transmitter disposed along the track and identified the train speed limit indicated by the ATC signal, and a speed correlating section for comparing the above speed limit with the actual train speed detected by a tachogenerator and for generating an ATC brake instruction signal when the result of that comparison proves that the detected train speed exceeds the predetermined speed limit. The signal receiving section of the ATC apparatus must be fully fail-safe so that it can satisfactorily demodulate the received frequency-modulated ATC signal to remove the carrier frequency and then accurately identify the predetermined speed limit by a frequency discriminating function. In order that this frequency discriminating function may not become abnormal, three signal receiving sections are generally provided to receive the frequency-modulated ATC signal, and the frequency of the demodulated ATC signal is determined by taking the majority of the signal receiving section outputs, that is, according to the rule of two-out-of-three. The result of frequency discrimination is such that one of the signal receiving section outputs is decided to be indicative of the speed limit under the condition that all of the signal receiving section outputs lower than that have already appeared. For example, the speed limit is decided to be 45 km/hr when signal receiving section output indicative of 30 km/hr has already appeared. The speed limit is decided to be 60 km/hr only when the signal receiving section outputs indicative of 30 km/hr and 45 km/hr have already appeared. Further, the speed limit shifts necessarily toward a lower speed in the event of failure of any one of the analog circuit components constituting the signal receiving section, so as to ensure the fail-safe performance of the signal receiving section.

Also, to ensure the fail-safe performance of the speed correlating section of the ATC apparatus, the speed correlating section has been so constructed that not only is a failure detecting function additionally provided, but also the failure-free operability of this failure detecting function can be checked.

The high degree of fail-safe performance of the ATC apparatus has thus been realized heretofore as will be understood from the above description. However, there is certainly a limit to the fail-safe performance of such a system, and it cannot be positively confirmed that the ATC apparatus is fail-safe under all conditions. This is because, in the realization of the fail-safe performance of the ATC apparatus, the failure mode of its parts is previously assumed, and also, the number of simultaneous occurrence of failures is assumed to be only one. In the case of a digital IC, for example, only a degeneration failure in which its input and output terminals are maintained fixed at the level of "0" or "1" is assumed, and no consideration is given to the uncertain failure in which the level of the output from the IC changes accidentally to "0" to "1", and no consideration is also given to a failure in which occurrence of an accident in the IC package results in a change in the designed function of the IC. Further, failures of plural parts due to, for example, an external surge voltage are not taken into consideration, and a short-circuit between conductors due to intrusion of foreign matter therebetween also is not taken into consideration. Generally, such a failure cannot occur or hardly occurs. On the other hand, however, it is well known that a vital accident typically occurs when a situation considered to rarely happen has occurred or when one problem has accidentally overlapped another problem.

As described already, it is the function of the signal receiving section of the ATC apparatus to discriminate the frequency of the received ATC signal, and, because of the fact that the ATC signal has a predetermined frequency, this function can be achieved by comparing the frequency of the ATC signal with those of a plurality of reference frequency signals. On the other hand, the frequency comparison itself is the sole function of the speed correlating section of the ATC apparatus. In spite of the fact that the signal receiving section and speed correlating section of the ATC apparatus are thus similar in their functions, these sections have been furnished as independent units in which not only the hardware parts but also the parts including the power sources and casings are separately provided. The resultant increase in the number of parts, volume, weight, power consumption, etc. of the prior art ATC apparatus has resulted in degradation of the reliability which is most important for this kind of apparatus.

SUMMARY OF THE INVENTION

It is a first object of the present invention to provide an ATC apparatus operable with reliability and fail-safe performance both of which are improved over those of the prior art.

It is the first feature of the present invention that the ATC apparatus comprises essentially read-only memory (which will be abbreviated hereinafter as a ROM) for storing various parameters, and a large-scale integrated circuit (which will be abbreviated hereinafter as an LSI) functioning as a logical operation section including a frequency signal input circuit for receiving a frequency signal, a comparison circuit for comparing the frequency signal applied from the frequency input circuit with a parameter read out from the ROM after attaining matching between the signal mode of these signals, and an output logic circuit logically operating on the result of comparison by the comparison circuit.

A second object of the present invention is to provide an ATC apparatus of simplified structure which is operable with improved reliability.

It is a second feature of the present invention that the function of discriminating the speed limit indicated by an ATC signal received by a receiver on the train and the function of comparing the speed limit with a signal indicative of the detected train speed are attained by single comparing means operated in a time division mode.

BRIEF DESCRIPTION OF THE DRAWINGS

FIG. 1 is a basic block diagram showing the general structure of a first preferred embodiment of the ATC apparatus according to the present invention.

FIG. 3 shows the truth table of the circuit shown in FIG. 2A.

FIG. 6 is a time chart illustrating the operation of the circuit shown in FIG. 2A or 2B.

FIG. 7A is a block diagram showing the detailed structure of the first embodiment of the present invention.

FIG. 7B shows in detail the connection between the ROM and the arithmetic LSI shown in FIG. 7A.

FIG. 8A illustrates, by way of example, the locations of the parameters stored in the ROM shown in FIG. 7A.

FIG. 8B illustrates the regions of the ROM in which the parameters are stored.

FIG. 9 is a time chart illustrating the operation of the embodiment shown in FIG. 7A.

FIG. 12 illustrates, by way of example, the locations of the parameters stored in the ROM shown in FIG. 11.

DESCRIPTION OF THE PREFERRED EMBODIMENTS

Figure 2A:
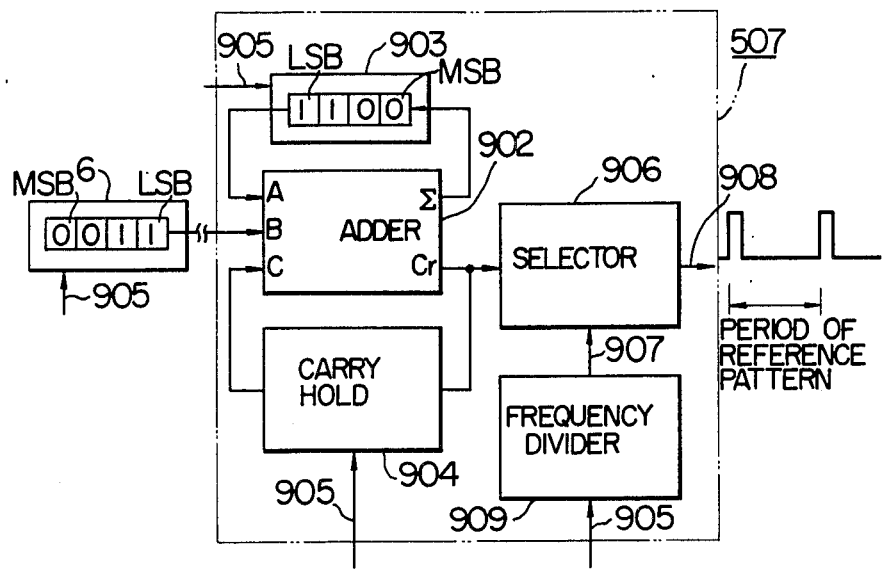
FIG. 2A is a block diagram showing the structure of the frequency pattern or reference frequency signal generating circuit employed in the first preferred embodiment of the present invention.

Preferred embodiments of the present invention will now be described in detail with reference to the drawings.

FIG. 1 is a basic block diagram showing the general structure of a first preferred embodiment of the ATC apparatus according to the present invention. Referring to FIG. 1, a receiver 1 and a tachogenerator 3 are connected to the ATC apparatus which is generally designated by the reference numeral 100 and includes an ATC signal demodulating circuit 2, a wave shaping circuit 4, an arithmetic LSI 5 carrying out logical operations, a ROM 6 storing various parameters and an output amplifying circuit 7. A frequency-modulated ATC signal transmitted from a track circuit is received by the receiver 1 and is then demodulated by the ATC signal demodulating circuit 2 to appear therefrom as a frequency signal indicative of a predetermined speed limit. The frequency signal is applied from the circuit 2 to the arithmetic LSI 5 which identifies the speed limit. On the other hand, a speed signal indicative of the detected speed of the train is transmitted from the tachogenerator 3 to the wave shaping circuit 4 in which the signal is subjected to wave shaping and level conversion to appear therefrom as a train speed-indicative pulse signal. This pulse signal is applied also to the arithmetic LSI 5. In the arithmetic LSI 5, the ATC signal is sequentially compared with the parameters stored in the ROM 6 to discriminate the speed limit which is specified from among a plurality of speed limits. Then, another parameter stored in the ROM 6 is used to generate a reference pattern proportional to the specified speed limit, and this reference pattern is compared with the train speed-indicative pulse signal to find whether or not the detected train speed exceeds the speed limit. When the result of comparison proves that the train speed exceeds the speed limit, an ATC brake instruction signal appears through the output amplifying circuit 7.

To assist in the understanding of the embodiment of the present invention shown in FIG. 1, the basic principle of the automatic train control according to the present invention will be described.

The speed limit signal applied from the ground equipment 1 to the ATC apparatus 100 is a frequency signal, and the output signal of the tachogenerator 3, which is indicative of the detected train speed and applied to the ATC apparatus 100, is also a frequency signal.

The frequency of the ATC signal is not in 1:1 correspondence with the value of the corresponding speed limit. It is necessary to identify the speed limit indicated by the ATC signal by comparing such an ATC signal with a plurality of predetermined reference frequency signals.

According to the present invention, therefore, digitized values of the reference frequencies are stored in the ROM 6, and, after converting the digitized values into the frequency signals in a converter, the frequency signals are compared in a comparator with the ATC signal and the train speed-indicative pulse signal both of which are frequency signals.

In the first place, the basic principle of generating operation of the frequency signal on the basis of the digitized values stored in the ROM 6 will be described.

Referring to FIG. 2A, a 1-bit full adder 902 executes binary addition of $$A+B+C$$

in response to the application of a 1-bit data input to each of its input terminals A, B and C. The result of binary addition in the full adder 902 provides a binary number of two bits at the maximum. The less significant bit appears at a terminal $\Sigma$, and the more significant bit appears at a carry terminal Cr as a carry signal.

The truth table of the binary addition in the full adder 902 is shown in FIG. 3.

Suppose now, for simplicity of explanation, that the data stored in the ROM 6 has a length of 4 bits, and a shift register 903 is a 4-bit register. Suppose further that data $(0011)_2$ is stored in the ROM 6 in order from the most significant bit (MSB) to the least significant bit (LSB). It is to be noted that $(a)_n$ generally expresses that a is an n-coded number.

Such data $(0011)_2$ is applied from the ROM 6 to the full adder 902 in order from the LSB to the MSB in response to the application of a clock signal 905.

Suppose that the initial content of the shift register 903 is $(0000)_2$. Then, as a result of serial application of the successive bits of the 4-bit data $(0011)_2$ from the ROM 6 to the full adder 902 in order from the LSB to the MSB, the binary number registered in the shift register 903 increases to $$(0000)_2+(0011)_2=(0011)_2$$

by the first addition, and its content is now as shown in FIG. 2A.

The content of the shift register 903 increases progressively with further application of the clock signal 905, as follows:

$$(0011)_2 + (0011)_2 = (0110)_2$$
$$(0110)_2 + (0011)_2 = (1001)_2$$
$$\vdots \qquad \vdots \qquad \vdots$$

The carry from each bit is temporarily held in a carry holding circuit 904 and appears from the carry holding circuit 904 during the addition of a more significant bit in phased relation with the clock signal 905.

The content of the shift register 903 increases further until it attains the value of $(1111)_2$ at the end of the fifth addition. Then, when the result of the sixth addition attains the value $$(1111)_2 + (0011)_2 = (10010)_2,$$

the carry signal Cr appears for the first time to indicate that a "1" appears in the 5th bit position, counted from the LSB, after the addition of the MSB's. A frequency divider circuit 909 divides the frequency of the clock signal 905 by the factor of 4 to provide a select signal 907 which is applied to a selector circuit 906, so that the carry signal Cr applied from the full adder 902 as a result of the addition of the MSB's in the sixth addition can only be selected in response to the application of the final clock pulse selected from among the four. Thus, an output signal 908 of level "1" appears from the selector circuit 906 in response to the application of the 24th clock pulse (in the sixth addition cycle) counted from the 1st clock pulse, that is, after the sixth addition of $(0011)_2$ to the content of the shift register 903. The content of the shift register 903 is now represented by $(0010)_2$, and the shift register 903 prepares for the next binary addition.

It will be apparent from the above description that, when parameter data stored in the ROM 6 has a large value, the frequency of carry occurrence during the addition of the MSB's, hence, the frequency of the output signal 908 from the selector circuit 906 is high, while when the parameter data has a small value, the frequency of the output signal 908 from the selector circuit 906 is low. It is therefore possible to change over the frequency of the reference pattern depending on the value of the parameter data stored in the ROM 6.

In order to achieve the ATC function, it is necessary to successively produce a plurality of reference frequency signals (frequency patterns) by means of the above-mentioned reference frequency signal generating means and sequentially compare them with the ATC signal, according to the principle above described.

Description will next be directed to the basic principle of the frequency comparison circuit disposed in the stage succeeding the frequency pattern generating circuit above described.

Figure 2B:
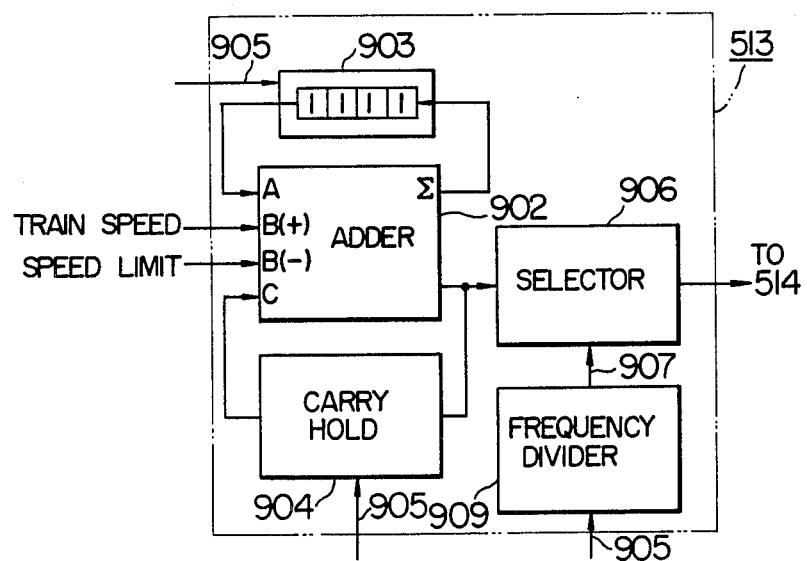
FIG. 2B is a block diagram showing the structure of the frequency comparison circuit employed in the first preferred embodiment of the present invention.

The frequency comparison circuit may have a structure which is substantially the same as that of the frequency pattern generating circuit, as shown in FIG. 2B. In FIG. 2B, like reference numerals are used to designate like parts appearing in FIG. 2A. Referring to FIG. 2B, an adder-subtractor 902 includes a positive input terminal B(+) and a negative input terminal B(−). The input to the positive input terminal B(+) of the adder-subtractor 902 is, for example, the train speed-indicative pulse signal, while the input to the negative input terminal B(−) is, for example, the speed limit-indicative pulse signal, and these two input signals are applied in a relation synchronous with each other. No change occurs in data registered in a 4-bit shift register 903 when the two input pulse signals are simultaneously applied to or are not applied to the respective input terminals B(+) and B(−) of the adder-subtractor 902. A "1" is added when the input pulse signal is applied to the positive input terminal B(+) only, and the result is registered in the shift register 903. On the other hand, a "1" is subtracted (hence, a "−1" is added) when the input pulse signal is applied to the negative input terminal B(−) only, and the result is registered in the shift register 903.

Therefore, when the frequency of the train speed-indicative pulse signal is higher somewhat than that of the speed limit-indicative pulse signal in the example above described, the value of the data registered in the shift register 903 increases progressively until it attains the value $(1111)_2$ shown in FIG. 2B. Then, when the train speed-indicative pulse signal alone is applied to the positive input terminal B(+) of the adder-subtractor 902, the carry signal Cr indicative of a carry from the most significant bit (MSB) appears from the adder-subtractor 902. As in the case of FIG. 2A, the carry signal Cr indicative of the carry from the MSB can only be selected by a selector circuit 906 so that the ATC brake instruction signal can similarly be generated. It can be seen that the circuit shown in FIG. 2B operates as an integrating type frequency comparator, and the integration time constant can be freely selected by changing the number of bits of the shift register 903 or by altering the settings of the weights of addition and subtraction at the individual bits.

While the above description has referred to the function of speed correlation only, the circuit shown in FIG. 2B can be also used for comparison between the ATC signal and the reference frequencies. The operation of the circuit itself is similar to that of the circuit shown in FIG. 2A and will therefore be readily understood.

The frequency of the ATC signal (the speed upper-limit instruction signal) practically employed is about 10 Hz to 100 Hz. Thus, when the ATC signal of, for example, 10 Hz is compared with a reference pattern of, for example, 9 Hz, a length of time longer than 1 second will be required until the final result of comparison is obtained. Therefore, the procedure that data stored in the ROM 6 is converted into the corresponding reference pattern and then the ATC signal is compared with the reference pattern, the above result of comparison is compared with the next reference pattern requires a length of time as long as more than several seconds will be required until the final result of comparison is obtained, since the ATC signal generally has four to ten frequency levels. This procedure will result in a danger because, in a worst case, the train will run a distance of several hundred meters without any deceleration from the point at which the upper-limit of the speed has been exceeded.

It is necessary to correlate all the signals in a parallel and continuous fashion in order to avoid the above danger and to obtain the final result of comparison as quickly as possible.

However, when a method of disposing a plurality of converters in parallel so as to simultaneously generate all of the reference frequencies to be compared with the ATC signal is employed, the scale of the circuit will become very large, and difficulty will be encountered in detecting a failure or failures occurring in one or more of the individual converters, so that the fail-safe performance which is most important to deal with a failure of the parts of the ATC apparatus may not be ensured.

As described already, the function of quickly identifying the frequency of the ATC signal, the function of quickly correlating the train speed signal with the identified ATC signal and the function of quick failure detection are essentially required for the ATC apparatus. According to the present invention, the method of so-called ring arithmetic is employed to meet the requirements for these functions.

The concept of this ring arithmetic will be explained with reference to FIG. 4. Herein, the process for generating each of single frequency patterns as described with reference to FIG. 2A, and the process for comparing the frequency of each of the single frequency patterns with that of the ATC signal or train speed-indicative signal as described with reference to FIG. 2B, are each called an operation stage. In the case of FIGS. 2A and 2B, one operation stage is composed of arithmetic operations on 4 bits.

Figure 4:
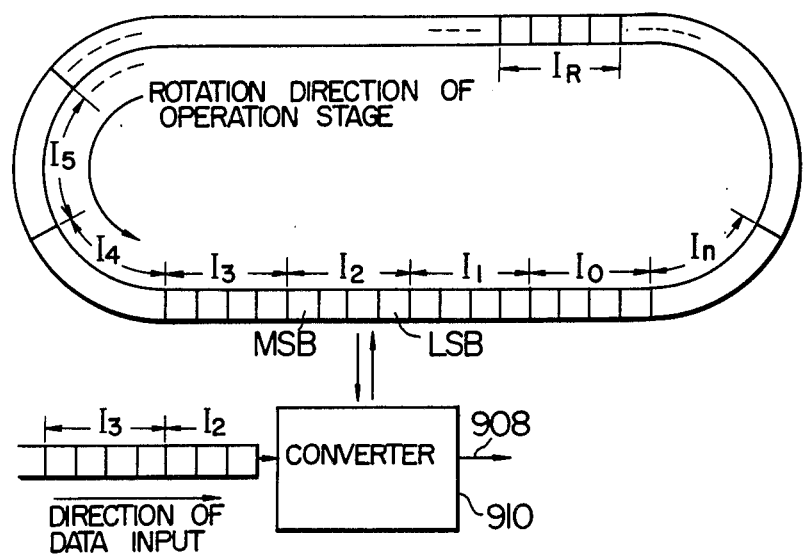
FIG. 4 illustrates the concept of the ring arithmetic employed in the present invention.

The designation of the ring arithmetic is derived from the fact that a plurality of operation stages $I_o, \ldots, I_k, \ldots, I_n$ for frequency pattern generation or frequency comparison are arranged in the form of a ring as shown in FIG. 4. The method is such that, while rotating the ring of the operation stages by one bit after another in synchronism with the clock signal, a train of input data is sequentially added bit-wise to the corresponding bits of the ring in a converter 910, and an output signal 908 indicative of the presence or absence of a carry due to the addition of the MSB of the input data to the MSB of each operation stage appears from the converter 910. This method is applied to both of the frequency pattern generating circuit 507 and the frequency comparison circuit 513.

Figure 5:
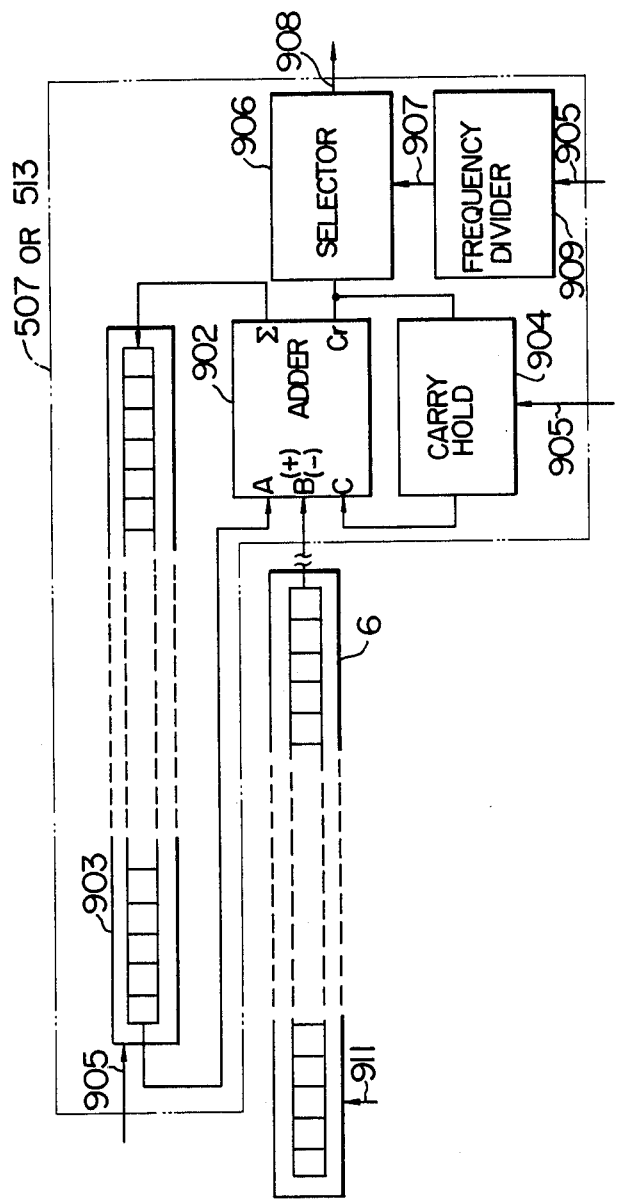
FIG. 5 is a detailed view of the circuit shown in FIG. 2A or 2B.

The practical circuit structure of, for example, the frequency pattern generating circuit 507 will be described with reference to FIG. 5. Referring to FIG. 5, the shift register 903 described with reference to FIG. 2A is so constructed that its number of bits is equal to the number of serial bits of all the operation stages, and the train of data stored in the ROM 6 is also arranged to meet the order of rotation of the operation stages.

The address signals for access to the data stored in the ROM 6 are also applied cyclically in synchronism with the rotation of the ring.

FIG. 6 shows various waveforms of the output signal 908 generated from the frequency pattern generating circuit 507 when the operation stages are sequentially numbered $I_o, I_1, I_2, \ldots, I_k, \ldots, I_n$, and the time required for one cycle of all the operation stages is represented by the operation period T. In the case of the frequency pattern generating circuit 507 shown in FIG. 2A, a single reference frequency pattern output signal 908 appears in one operation period. On the other hand, in the case of the ring arithmetic, the output signal 908 has a pulse train as shown in the lower portion of FIG. 6 because a plurality of reference frequency patterns generated from a plurality of operation stages appear in one operation period T. It will be seen in FIG. 6 that output signals from a plurality of operation stages processed in one operation period T provide a train of pulses providing necessary reference frequency patterns.

Therefore, the reference frequency patterns included in the output signal 908 from the frequency pattern generating circuit 507 are separated according to the individual operation stages in the succeeding frequency comparison circuit 513 to be compared with the input frequency signal in the manner described already. That is, the frequency comparing circuit 513 attains, by the time divisional use of the single circuit based on the principle of ring arithmetic, both the function of identifying the ATC speed limit by comparing the frequency of the ATC signal with a plurality of reference frequencies and the function of speed correlation by comparing the frequency of the train speed-indicative signal with the frequency corresponding to the identified speed limit thereby generating the ATC brake instruction signal when the train speed exceeds the speed limit.

Thus, when a single circuit is adapted to execute all of the necessary arithmetic operations, a failure occurring in any one of the parts of the circuit results immediately in appearance of an abnormality in any one of the results of arithmetic operations.

However, when a failure detecting circuit is disposed independently of the flow of the data to be arithmetically processed, the occurrence of a failure in the failure detecting circuit itself cannot be detected resulting in the loss of the desired fail-safe performance of the ATC apparatus.

A method to be described presently is employed in the present invention to solve the above problem. According to the method employed in the present invention, one of the operation stages arranged in the form of the ring is selected for the purpose of failure detection so that a pattern generated from this operation stage in an abnormal condition differs from that generated in the normal or failure-free condition. The pattern appearing in the normal condition is selected to be a specific AC signal, while the pattern appearing in the abnormal condition is selected to be a DC signal. By amplifying such a pattern signal by means of an amplifier and energizing an electromagnetic relay through a transformer coupling, occurrence of the abnormal condition or failure can be reliably indicated.

Further, by so arranging that all of the parts of the circuit contribute to the formation of the above pattern, a failure can be necessarily indicated in the event of occurrence of an abnormal condition in any one of the circuit parts, thereby ensuring the desired fail-safe performance of the ATC apparatus.

The above description has explained the basic principle of the operation of the embodiment of the present invention to be described in further detail hereunder. The frequency signal generating circuit 507 and the frequency comparison circuit 513 described later may both have a structure as shown in FIG. 5. It is needless to mention that the circuit structure shown in FIG. 5 may be applied to one of these two circuits instead of being applied to both of them, and another circuit structure may be applied to the other.

FIG. 7A shows in further detail the structure of the arithmetic LSI 5 and ROM 6 included in the embodiment shown in FIG. 1, and FIG. 8A illustrates, by way of example, the locations of data or parameters stored in the ROM 6. Referring to FIG. 7A, the ROM 6 storing the parameters is connected to the arithmetic LSI 5 which includes a clock generating circuit 501, an address generating circuit 502 generating address signals for access to the parameters stored in the ROM 6, a timing control circuit 503 controlling the operation timing of internal elements of the arithmetic LSI 5, a first input data buffer circuit 504 and a second input data buffer circuit 505 for delaying the parameters applied from the ROM 6, a gate circuit 506 for selectively permitting application of the data applied from the ROM 6 to the frequency pattern generating circuit 507 (corresponding to a first signal mode matching circuit) which converts the parameters read out from the ROM 6 into corresponding frequency signals, a parity check circuit 508 for the parity check of the parameters applied to the frequency signal generating circuit 507, a first speed signal synchronizing circuit 509 and a second speed signal synchronizing circuit 510 receiving the train speed-indicative pulse signal in synchronous relation with the operation timing of the internal elements of the arithmetic LSI 5, an ATC signal synchronizing circuit 511 receiving similarly the ATC signal in synchronous relation with the operation timing of the internal elements of the arithmetic LSI 5, a signal input control circuit 512 for selectively applying the signal inputs to the frequency comparison circuit 513 which carries out the frequency comparison in the manner described already, an output logic circuit 514 logically operating on the result of comparison in the frequency comparison circuit 513 thereby generating the ATC brake instruction signal depending on the result of comparison, a frequency signal output circuit 515 delivering the output signal FS of the frequency signal generating circuit 507 to the exterior as a speed indication signal $f_V'$, ROM parameter input ports 516 to 519 for applying the parameters read out from the ROM 6 to the arithmetic LSI 5, a CRC check (cyclic redundancy check) circuit 520 for carrying out the CRC of the ROM parameters applied through the ROM parameter input port 518 (the code added to the data for the purpose of cyclic redundancy check being called the CRC code), and a clock control circuit 521 controlling the operation timing of the first and second data buffer circuits 504 and 505. In FIG. 7A, the reference numeral 8 designates a crystal oscillator which regulates the frequency of the clock signal generated from the clock generating circuit 501.

FIG. 7B shows in detail the connection between the ROM 6 and the arithmetic LSI 5. It will be seen in FIG. 7B that the data stored in the ROM 6 and read out from a selected one of parallel bit terminals $D_o$ to $D_7$ are applied to the ROM data input port 517 through a wheel-diameter setting rotary switch 9.

FIG. 8A illustrates, by way of example, the locations of the parameters stored in the ROM 6. Referring to FIG. 8A, $I_o$ to $I_{15}$ designate ROM addresses corresponding to the respective operation stages, and the parameters stored in the ROM 6 are arranged in the address direction so that they can be read out in a bit serial mode. Symbols $RSD_o$ to $RSD_9$ designate ATC signal patterns for identifying the corresponding ATC signal frequencies, and $VPD_o$ to $VPD_9$ designate speed patterns specifying the speed limits corresponding to the respective frequencies of the ATC signal. Symbols $RSC_o$ to $RSC_9$ designate patterns providing complements of the respective ATC signal patterns of specific frequencies. Symbols 5KP and TGF designate a 5 km/hr pattern and a conductor disconnection detection pattern respectively. Symbols $WDC_1$ and $WDC_8$ designate wheel-diameter compensation parameters, CRC designates the CRC check code, and FDD designates the failure detection pattern. Each of the operation stages $I_o$ to $I_{15}$ is composed of 16 bits $b_o$ to $b_{15}$, and the signal parameters are stored in the form of a binary number. These parameters are read out in a bit serial mode in the order of from the least significant bit $b_o$ to $b_1, b_2, \ldots$ to the most significant bit $b_{15}$ and also in the order of the operation stages $I_o, I_1, I_2, \ldots, I_{15}$. Such a reading operation is repeated at a high speed. As also shown in FIG. 7B, the data (parameters) associated with the bit terminal $D_o$ among the parallel bit terminals $D_o$ to $D_7$ are applied to the arithmetic LSI 5 through the input port 516. Similarly, the data (parameters) associated with the bit terminals $D_1$ and $D_2$ are applied to the arithmetic LSI 5 through the input ports 518 and 519 respectively. In the operation stage $I_{14}$ provided for the wheel diameter compensation, the data $WDC_i$ associated with a selected one of the bit terminals $D_o$ to $D_7$ is applied to the arithmetic LSI 5 through the input port 517 depending on the set position of the rotary switch 9. FIG. 7B shows that the rotary switch 9 is set at the position connected to the bit terminal $D_1$. In this case, the wheel-diameter compensation parameter $WDC_2$ shown in FIG. 8A is applied to the arithmetic LSI 5 in the operation stage $I_{14}$.

FIG. 8B illustrates how all of the parameters are stored in the ROM 6. In the region associated with the signal FB described later, the data (parameters) shown in FIG. 8A are directly stored, while in the region associated with the signal $\overline{FB}$, the failure detection pattern FDD and the CRC check code CRC are stored in a form which will intentionally yield a judgment of occurrence of a failure. In the latter region, the data (parameters) entirely the same as those stored in the former region may also be stored. According to the present invention, such a double ROM parameter arrangement is employed since, actually, the ATC signal patterns $RSD_o$ to $RSD_9$ stored in the region associated with the signal $\overline{FB}$ are modified from those stored in the region associated with the signal FB, and other modifications are also made. However, the detail of the actual procedure will not be described herein as it has no concern with the essence of the present invention.

The operation of the circuit having the structure shown in FIG. 7A will now be described with reference to a time chart of FIG. 9. Referring to FIG. 9, $I_o$ to $I_{15}$ designate the sixteen operation stages for operating the frequency pattern generating circuit 507 and frequency comparison circuit 513 in a time division mode. As shown in (s) of FIG. 9, the ten stages $I_o$ to $I_9$ among the sixteen operation stages $I_o$ to $I_{15}$ are allotted to the function of identification of the ATC signal, while the remaining six operation stages $I_{10}$ to $I_{15}$ are allotted to the other functions. The stage $I_{10}$ is allotted to the function (TFS) of detecting a conductor disconnection failure in the tachogenerator 3, and the stage $I_{11}$ is allotted to the function (5KS) of 5 km/hr detection. The stage $I_{12}$ is allotted to the function (VDS) of speed correlation with the speed limit, and the stage $I_{13}$ is allotted to the function (RCS) of checking whether or not the ATC signal has been accurately identified. The stage $I_{14}$ is allotted to the function (WCS) of wheel diameter compensation, and the stage $I_{15}$ is allotted to the function (FDS) of failure diagnosis.

Among the data stored in the ROM 6 and shown in FIG. 8A, that which is effectively utilized in the frequency signal generating circuit 507 (the data actually applied to the frequency sinal generating circuit 507) is shown in (d) of FIG. 9. The three data VPDi, RSCi and WDCi with a suffix i among them represent one of the data in each of the corresponding data groups. The frequency signal generating circuit 507 generates the reference patterns described later in response to the application of these parameters. Three frequency signals are compared with the reference patterns in the frequency comparison circuit 513. They are the ATC signal $f_a$, train speed-indicative signal $f_v$ and failure detection signal $f_c$ which are applied to the frequency comparison circuit 513 with timing shown in (a), (v) and (c) of FIG. 9 respectively. The output signal FS from the frequency signal generating circuit 507 appears with a delay of one operation stage as described later, and, therefore, these frequency signals $f_a$, $f_v$ and $f_c$ are applied to the frequency comparison circuit 513 in a relation shifted by one operation stage from the associated operation stages for the frequency signal generating circuit 507. FIG. 9 shows in (b) the comparator output signal FB (described later) indicative of the result of comparison in the frequency comparison circuit 513. In FIG. 9, the signal FB has a level "1" when the frequency of the reference pattern is higher than that of the signals $f_a$, $f_v$ and $f_c$. FIG. 9 shows in (p) and (r) the data stored in the first and second input data buffer circuits 504 and 505 respectively shown in FIG. 7A.

The data read out through the bit terminal $D_0$ in FIG. 8A are applied to a bit serial mode through the ROM data input port 516 shown in FIG. 7A to be applied to the gate circuit 506 without any delay. The data read out through the bit terminals $D_1$ and $D_2$ in FIG. 8A is applied through the ROM data input ports 518 and 519 to be delayed by the first and second input data buffer circuits 504 and 505 respectively. In the operation stages $I_0$ to $I_9$, the frequency parameters $RSD_0$ to $RSD_9$ used for identifying the ATC signal are sequentially applied to the frequency signal generating circuit 507 to be converted into the respective reference frequency signals (ATC signal patterns $f_{ap}$). On the other hand, the ATC signal is applied to the ATC signal synchronizing circuit 511, thence, through the signal input control circuit 512 to the frequency comparison circuit 513 in which the frequency of the ATC signal is compared with that of each of the reference frequency signals.

In one of the operation stages $I_0$ to $I_{10}$, the frequency of the ATC signal pattern $f_{ap}$ becomes lower than that of the ATC signal since the ATC signal is sequentially compared with the reference pattern of higher frequency to that of lower frequency that is, the output signal FB appearing from the frequency comparison circuit 513 is inverted from its "1" level to its "0" level in one of the operation stages $I_0$ to $I_{10}$. FIG. 9 illustrates that the level inversion occurs in the operation stage $I_5$. The resultant output signal FB from the frequency comparison circuit 513 inhibits application of data from the input ports 518 and 519 to the first and second input data butter circuits 504 and 505, so that the data held in these input data buffer circuits 504 and 505, that is, the data $VPD_4$ and $RSC_4$ held in the respective buffer circuits 504 and 505 in the case of FIG. 9 are temporarily latched. On the basis of the above consequence, reference patterns $f_{p10}$ to $f_{p13}$ to be compared with the train speed-indicative signal $f_v$ are sequentially generated from the frequency generating circuit 507 in the operation stages $I_{10}$ to $I_{13}$.

Figure 10:
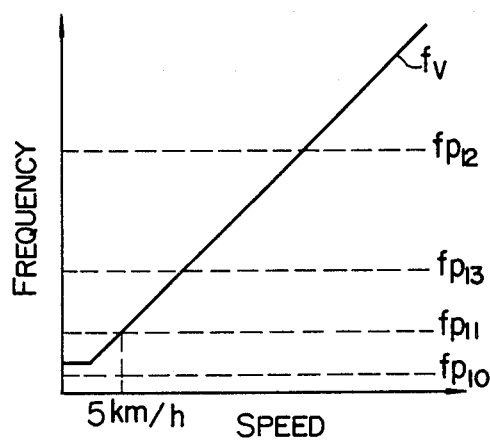
FIG. 10 is a graph showing, by way of example, a group of reference frequency signals to be compared with the train speed signal.

FIG. 10 shows the relation between the train speed-indicative signal $f_v$ and these reference patterns $f_{p10}$ to $f_{p13}$. The train speed-indicative signal $f_v$ of a constant frequency is generated even when the speed of the train is zero, provided that the tachogenerator 3 is free from a conductor disconnection trouble, and the disconnection detecting pattern $f_{p10}$ is generated in the operation stage $I_{10}$ to detect such a trouble. The 5 km/hr detecting pattern $f_{p11}$ generated in the operation stage $I_{11}$ has a frequency corresponding to the speed of 5 km/hr. The speed limit pattern $f_{p12}$ appears in the operation stage $I_{12}$, and the check signal pattern $f_{p13}$ appears in the operation stage $I_{13}$. The patterns $f_{p12}$ and $f_{p13}$ have frequencies variable depending on the result of identification, hence, the received specific ATC signal. In other words, they are a function of the ATC signal. In this manner, the individual data for generating the individual patterns corresponding to the specific ATC signal are temporarily latched in the first and second input data buffer circuits 504 and 505 by the application of the comparator output signal FB indicative of the identification of the ATC signal, and this data is then applied to the frequency signal generating circuit 507 in the operation stages $I_{12}$ and $I_{13}$ so as to generate the patterns $f_{p12}$ and $f_{p13}$ corresponding to the specific ATC signal. Especially, the speed limit pattern $f_{p12}$ generated in the operation stage $I_{12}$ represents the speed limit dictated by the ATC signal and is used for correlation with the actual speed of the train.

It will thus be seen that, in the above-described embodiment of the present invention, the step of generation of the speed limit signal corresponding to the ATC signal and the step of correlation of the speed limit with the actual speed are executed in the same LSI and by use of the same arithmetic operation route. However, the apparatus may be so constructed that the LSI functions merely as the receiving part finally generating the speed limit signal, and the speed correlating part is provided by a separate hardware device, or, conversely, the LSI functions merely as the speed correlating part, and the receiving part is provided by a separate hardware device. The wheel diameter compensation is executed in the operation stage $I_{14}$. In this operation stage $I_{14}$, a wheel-diameter compensation parameter $WDC_i$ applied through the ROM data input port 517 is converted into a corresponding frequency pattern each time the train speed-indicative signal $f_v$ is applied to the first speed signal synchronizing circuit 509. The compensated speed pulse signal $f_v'$ appearing as a result of wheel diameter compensation is applied from the frequency signal output circuit 515 to the exterior of the LSI 5 to be used for the purpose of, for example, speed display. At the same time, this signal $f_v'$ is applied to the second speed signal synchronizing circuit 510 so that various reference patterns can be compared again with the wheel diameter-compensated speed signal.

Whether or not an error has occurred in any one of the parameters is checked by the parity check circuit 508 in a manner similar to that described hereinbefore. The CRC check circuit 520 executes its CRC check function so as to detect whether or not a parameter is replaced by another parameter due to a failure occurring in the address lines. This CRC check circuit 520 is also periodically checked for an abnormal operation in a manner similar to that described for the parity check circuit 508.

This failure detecting operation will be described in detail. The control function of the parity check circuit 508 is such that, when it detects a parity error in a parameter, it applies an input $(1111)_2$ to the frequency signal generating circuit 507 in the failure diagnosis (FDS) stage, while when it does not detect any parity error, it applies an input $(0000)_2$ to the circuit 507. Consequently, the output signal applied from the frequency signal generating circuit 507 to the frequency comparison circuit 513 has its highest frequency in the presence of a parity error and has its "0" frequency in the absence of such an error.

On the other hand, the CRC check circuit 520 checks the validity of the cyclic code CRC for the patterns applied in the bit serial mode from the bit terminal $D_1$ in the operation stages $I_o$ to $I_{14}$ among the ROM parameters shown in FIG. 8A. The control function of the CRC check circuit 520 is such that, when it detects an error, the signal input control circuit 512 applies an input of "0" frequency to the frequency comparison circuit 513 in the failure diagnosis (FDS) stage, while when it detects that the cyclic code CRC is valid, the circuit 512 applies an input of highest frequency to the circuit 513.

Consequently, the output signal FB from the frequency comparison circuit 513 is positive in the presence of both a parity error and a CRC error in any one of the parameters read out from the ROM 6 and is negative in the absence of both of such errors. When one of the parity error and the CRC error is present, the two inputs to the frequency comparison circuit 513 are equal to each other, and the output signal FB from the circuit 513 is maintained in its previous value.

Suppose now that the values of the parameters FDD and CRC among the parameters read out from the ROM 6 are valid when FB="1", and these values are not valid when FB="0". Then, an oscillation or repeated alternate inversion of the level pursuant to every level change occurs in the signal FB in the failure diagnosis (FDS) stage.

Such an alternating voltage signal FB appearing in the failure diagnosis (FDS) stage may be selectively delivered from the output logic circuit 514. In the event of occurrence of a failure at whatever portion of the circuits disposed in the routes extending from the ROM 6 and its peripheral circuits through the parity check circuit 508 and CRC check circuit 520 to the output logic circuit 514, such an alternating voltage output signal FB disappears so that failure detection can be reliably attained.

It will be understood from the foregoing description of the embodiment of the ATC apparatus according to the present invention that a parameter-storing ROM, an arithmetic LSI, and circuits for demodulation, wave shaping and amplification of input and output signals are merely required for constituting the ATC apparatus. In other words, both the ATC signal identifying function and the speed correlating function of the prior ATC apparatus can be executed by a common hardware device, especially, a single LSI. This means that the IC's resistors, capacitors and other parts totaling about one hundred, the soldering portions as many as several hundreds, the connectors between the printed circuit boards, the relays, etc. in the prior art ATC apparatus are replaced by an ROM and an LSI. Suppose that the failure rate per part is 10 Fit and that of the LSI is 200 Fit taking into acount the various factors above described, then, the failure rates of these parts can be improved by the factor of 10. This means that the probability of occurrence of an uncertain failure described hereinbefore, that is, a failure including the possibility of giving rise to fail-out can be reduced, and the probability of occurrence of a failure such as a short-circuit between conductors can also be reduced. Therefore, the present invention can provide an ATC apparatus which is small in size, operable with high reliability and exhibits high fail-safe performance.

Figure 11:
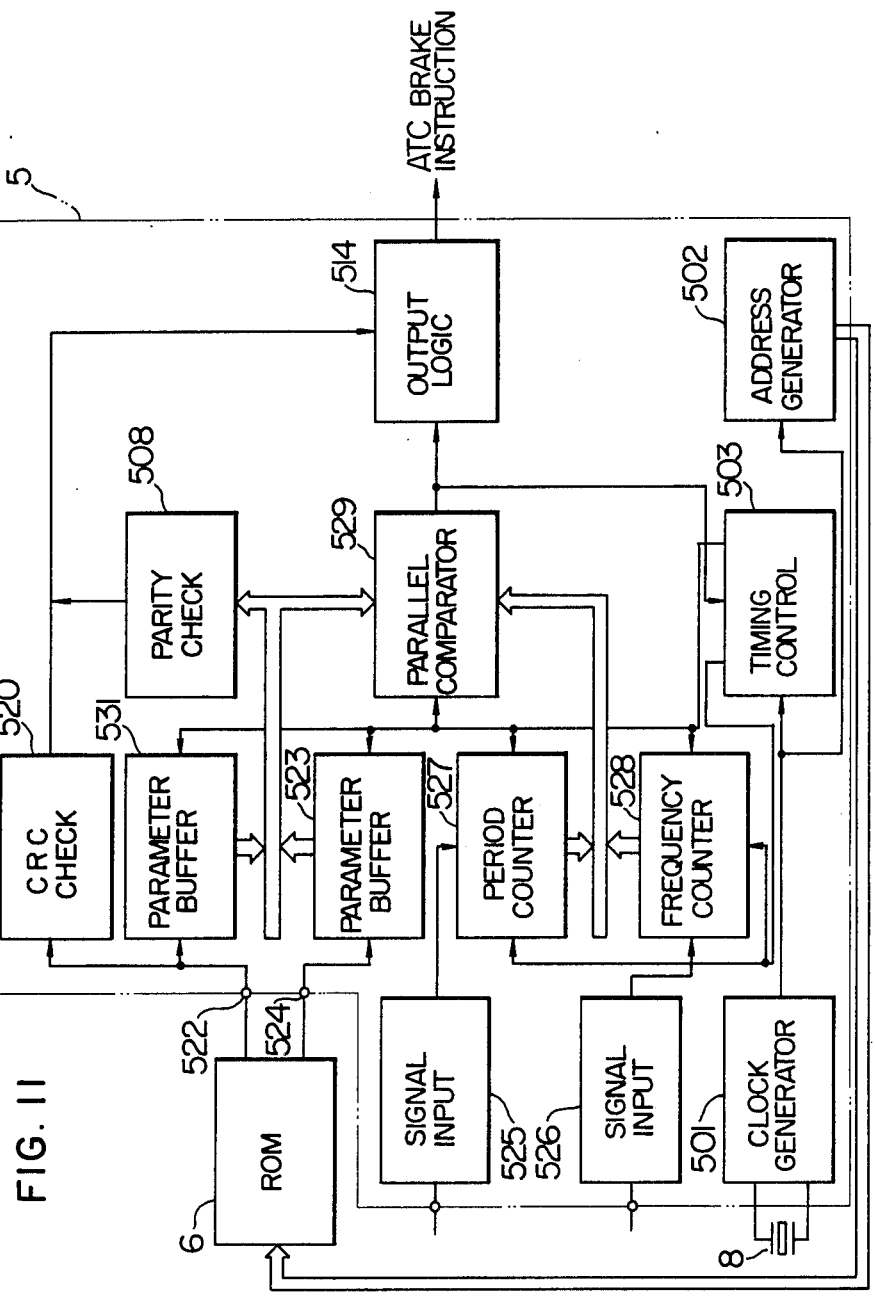
FIG. 11 is a block diagram showing in detail the structure of a second preferred embodiment of the present invention.

FIG. 11 shows another embodiment of the present invention in which the same reference numerals are used to designate the same parts appearing in FIG. 7A. Referring to FIG. 11, the arithmetic LSI 5 includes, besides the circuits 501, 502, 503, 508, 514 and 520, a first parameter buffer circuit 531 converting a first parameter applied in a bit serial mode through a first parameter input port 522 into a parallel data, a second parameter buffer circuit 523 converting a second parameter applied in a bit serial mode through a second parameter input port 524 into parallel data, a first signal input circuit 525 receiving the ATC signal, a second signal input circuit 526 receiving the train speed-indicative signal, a period counter 527 converting the ATC signal into a parallel data, a frequency counter 528 converting the train speed-indicative signal into parallel data, and a parallel comparison circuit 529.

FIG. 12 shows parameters stored in the ROM 6 shown in FIG. 11, and the symbols have meanings similar those described with reference to FIG. 8A. The parameters in the first row in FIG. 12 are applied to the arithmetic LSI 5 through the first parameter input port 522 shown in FIG. 11, and, similarly, the parameters in the second row are applied to the arithmetic LSI 5 through the second parameter input port 524.

Referring to FIGS. 11 and 12, the parameters $RSD_o$ to $RSD_7$ and $VPD_o$ and $VPD_7$ corresponding to the ATC signal and speed limit are applied to the first and second parameter buffer circuits 531 and 523 respectively in the operation stages $I_o$ to $I_7$ with the timing determined by the timing control circuit 503. On the other hand, the ATC signal is applied through the first signal input circuit 525 to the period counter 527, so that the period of the ATC signal is counted by the period counter 527 in response to the application of high-speed clock pulses from the timing control circuit 503. The period of the ATC signal thus counted is sequentially compared in the parallel comparison circuit 529 with the parameters $RSD_o$ to $RSD_7$ applied through the first parameter buffer circuit 531. When, for example, the parameter $RSD_5$ applied in the operation stage $I_5$ coincides with the period of the ATC signal, the second parameter $VPD_5$ applied in that operation stage $I_5$ is held in the second parameter buffer circuit 523 under control of the control signal applied from the timing control circuit 503.

The frequency counter 528 counts the number of speed pulses applied through the second signal input circuit 526 within a predetermined sampling period of sampling pulses applied from the timing control circuit 503, thereby counting the frequency of the train speed-indicative pulse signal. This is read out in a bit parallel mode so as to attain matching between the signal mode of the train speed-indicative pulse signal and that of the parameter signal. In the operation stages $I_8$ and $I_9$, the count indicative of the frequency of the train speed-indicative pulse signal is compared in the parallel comparison circuit 529 with the parameters TGF and 5KP applied through the first parameter buffer circuit 531. In the operation stage $I_{10}$, the counter indicative of the frequency of the train speed-indicative pulse signal is similarly compared in the parallel comparison circuit 529 with the speed limit pattern $VPD_5$ held in the second parameter buffer circuit 523 for the purpose of speed correlation. In the operation stage $I_{11}$, the CRC check circuit 520 executes the CRC check on the parameters in the first row in FIG. 12 so as to diagnose the address system of the ROM 6 for the presence of a failure.

It will be seen from the above description of the second embodiment of the present invention that the frequency signal generating circuit is unnecessary since the frequency signal such as the ATC signal or the train speed-indicative signal is converted into a parallel signal which is compared with the parameter in a bit parallel mode. Further, by the provision of a plurality of input ports, identification of the ATC signal is facilitated, and the signal receiving part and the signal correlating part can be united, which contributes greatly to the improvement in the reliability of the entire ATC apparatus. Furthermore, due to the fact that the frequency of the ATC signal is low or about 10 Hz to 100 Hz, the technique of period measurement can be taken during the conversion of the ATC signal into the parallel mode to ensure conversion with high accuracy.

What is claimed is:

1. An automatic train control apparatus responsive to a frequency-modulated ATC signal, which is transmitted from a transmitter disposed along the train track and indicates one of a plurality of selected speed limits, for limiting the speed of the train as indicated by a speed signal received from a speed detector to a speed not higher than the speed limit indicated by the ATC signal, comprising:

memory means including a read-only memory for storing digital codes corresponding to respective ones of said plurality of selected speed limits; and a large-scale integrated circuit connected to said read-only memory, and including:

(a) signal input means for receiving an ATC signal from said transmitter and said speed signal having a frequency corresponding to the train speed from said speed detector, (b) speed limit detecting means connected to said signal input means and said read-only memory for identifying the speed limit indicated by said received ATC signal and for reading out of said read-only memory a digital code corresponding to said identified speed limit, (c) speed correlation means for comparing the speed limit indicated by the received ATC signal with the actual train speed indicated by said received speed signal, including first signal mode matching means connected to said signal input means and said speed limit detecting means for converting the mode of said speed signal or the mode of said digital code read out of said read-only memory to produce a speed signal and a speed limit signal whose signals modes correspond to each other, and comparison means connected to said signal mode matching means for producing an output when said speed signal exceeds said speed limit signal, and (d) output means for delivering a false instruction signal in response to the output of said comparison means so as to prevent the train from exceeding the speed indicated by said ATC signal.

2. An automatic train control apparatus according to claim 1, wherein said read-only memory stores, for each of said selected speed limits, a first digital code representing a parameter for identifying the speed limit and a second digital code representing a parameter of the speed limit, and wherein said speed limit detecting means includes means for identifying the speed limit indicated by the recevised ATC signal on the basis of the first digital codes stored in said read-only memory.

3. An automatic train control apparatus according to claim 2, wherein said memory means includes means for successively reading-out said first digital codes and wherein said identifying means includes second signal mode matching means connected to said signal input means and said read-only memory for converting the mode of said ATC signal or the mode of said first digital codes to produce a first output signal and a sequence of second output signals all having the same signal mode and correspond to said ATC signal and said first digital codes, respectively, correlating means for correlating said first output signal with said sequence of second output signals, and output means connected to said correlating means for identifying the first digital code which corresponds to said ATC signal and for generating an address signal for reading out of said read-only memory the second digital code correspond to the same speed limit as the first digital code identified by said correlating means.

4. An automatic train control apparatus according to claim 3, wherein said comparison means in said speed correlation means and said correlating means in said identifying means are provided by means including a single comparison circuit for executing the functions of the comparison means and the correlating means in a time division mode.

5. An automatic train control apparatus according to claim 1, wherein said first signal mode matching means includes means for converting said digital code read out of said read-only memory to a frequency signal, and said comparison means includes means for comparing the frequency of said speed signal to the frequency of said frequency signal from said converting means.

6. An automatic train control apparatus according to claim 1, wherein said first signal mode matching means includes means for converting said speed signal from said signal input means to a digital code, and said comparison means includes means for comparing the digital code from said converting means with the digital code read out of said read-only memory means.

7. An automatic train control apparatus according to claim 3, wherein said second signal mode matching means includes means for converting said second digital codes read out of said read-only memory to frequency signals corresponding to the frequencies of said ATC signals for different ones of said plurality of selected speed limits, and said correlating means includes means for effecting a successive comparison between said ATC signal received by said signal input means and the frequency signals produced by said converting means.

8. An automatic train control apparatus according to claim 3, wherein said read-only memory also stores an error check code which is read out with said digital codes, and said large-scale integrated circuit further includes error detecting means for detecting an error in the first and second digital codes read out of said read-only memory on the basis of said error check code.

9. An automatic train control apparatus according to claim 8, wherein said error check code includes a CRC code added to said digital codes, and said error detecting means includes a CRC error check circuit.

10. An automatic train control apparatus for receiving a frequency-modulated ATC signal transmitted from a transmitter disposed along the track, for comparing the speed limit indicated by the received ATC signal with the actual train speed detected by a speed detector and for delivering a brake instruction signal when the detected speed exceeds the speed limit so as to run the train at a speed not higher than the speed limit, said automatic train control apparatus comprising means for generating a plurality of reference signals used for identifying the speed limit indicated by said ATC signal, first comparing means for comparing said ATC signal sequentially with said plural reference signals and for producing an output signal identifying the reference signal which corresponds to said ATC signal, means for generating one of a plurality of speed limit signals corresponding to the speed limit indicated by said ATC signal in response to the output signal appearing from said first comparing means, second comparing means for comparing a train speed-indicative signal from said speed detector with said speed limit signal, said reference signals generating means and said speed limit signal generating means including means for storing parameters corresponding to a plurality of predetermined reference signals which are compared with said ATC signal to identify the speed limit included in said ATC signal and speed limit signal, and means for reading out said parameters while effecting a matching between the signal mode of the read-out parameters and that of said ATC signal and said train speed-indicative signal, and output means for delivering a brake instruction signal in accordance with the result of said comparison by said second comparing means, so as to prevent the train from exceeding the speed indicated by said ATC signal.

11. An automatic train control apparatus as claimed in claim 10, wherein said first and second comparing means are provided by single comparing means which executes the functions of said first and second comparing means in a time division mode.

12. An automatic train control apparatus as claimed in claim 10, wherein said plural reference signals, said speed limit signals and said train speed-indicative signal are frequency signals, and said first and second comparing means comprise frequency comparing means.

13. An automatic train control apparatus as claimed in claim 10, wherein said reference signal generating means and said speed limit signal generating means are provided by single signal generating means which executes the functions of said reference signal generating means and said speed limit signal generating means in a time division mode.

14. An automatic train control apparatus responsive to a frequency-modulated ATC signal, which is transmitted from a transmitter disposed along the train track and indicates one of a plurality of selected speed limits, for limiting the speed of the train as indicated by a speed signal received from a speed detector to a speed not higher than the speed limit indicated by the ATC signal, comprising:

memory means including a read-only memory for storing digital codes corresponding to respective ones of said plurality of selected speed limits; and
  a large-scale integrated circuit connected to said read-only memory, and including:
  (a) signal input means for receiving an ATC signal from said transmitter and said speed signal having a frequency corresponding to the train speed from said speed detector,
  (b) means for identifying the speed limit included in the ATC signal, connected to said read-only memory for storing a first parameter which is a comparison reference value for identifying the speed limit, said speed limit identifying means comprising first signal mode converting means for converting said first parameter into a signal mode comparable to the ATC signal, second signal mode converting means for converting the ATC signal into a signal mode comparable to said first parameter, and a comparison circuit for comparing the converted first parameter with the ATC signal;
  (c) speed correlation means for determining whether or not a train speed exceeds the identified speed limit, connected with said read-only memory for storing a second parameter which is a reference value for the speed limit comparison corresponding to the identified speed limit, said speed correlation means comprising third signal mode converting means for converting said second parameter into a signal mode comparable to a speed signal from speed detector, fourth signal mode converting means for converting said speed signal into a signal mode comparable to said second parameter, and a comparison circuit for comparing said converted second parameter with said speed signal to produce an output signal,
  (d) output means for delivering a false instruction signal in response to said output signal of said comparison circuit so as to prevent the train from exceeding the speed indicated by said ATC signal.

* * * * *